United States Patent
Garudadri et al.

(10) Patent No.: US 6,519,479 B1
(45) Date of Patent: Feb. 11, 2003

(54) SPOKEN USER INTERFACE FOR SPEECH-ENABLED DEVICES

(75) Inventors: Harinath Garudadri, San Diego, CA (US); Andrew P. Dejaco, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 09/283,340

(22) Filed: Mar. 31, 1999

(51) Int. Cl.[7] .............................. H04M 1/00; H04B 1/38
(52) U.S. Cl. ........................ 455/563; 455/564; 455/569; 379/355.01; 379/355.07; 379/356.01; 379/142.01; 379/88.03
(58) Field of Search ............................... 455/563, 564, 455/556, 569, 414, 418, 412; 704/270, 273, 275; 379/88.03, 355, 356, 88.01, 88.02, 88.04, 88.08, 88.12, 355.01, 355.02, 355.04, 355.07, 356.01, 360, 142.01, 142.02, 93.23, 354

(56) References Cited

U.S. PATENT DOCUMENTS

| | | | | |
|---|---|---|---|---|
| 4,961,212 A | * | 10/1990 | Marui et al. ............. | 379/88.03 |
| 5,414,796 A | | 5/1995 | Jacobs et al. ............. | 395/2.3 |
| 5,481,595 A | * | 1/1996 | Ohashi et al. ............ | 379/355 X |
| 5,530,745 A | * | 6/1996 | Urasaka et al. ............. | 379/355 |
| 5,835,570 A | | 11/1998 | Wattenbarger | |
| 6,005,927 A | * | 12/1999 | Rahrer et al. .......... | 379/142.01 |
| 6,169,799 B1 | * | 1/2001 | McIntosh ................... | 379/355 |
| 6,272,361 B1 | * | 8/2001 | Courtis et al. .......... | 455/563 X |
| 2002/0069064 A1 | * | 6/2002 | Dejaco et al. ............. | 704/270 |

FOREIGN PATENT DOCUMENTS

| | | |
|---|---|---|
| EP | 0800304 | 10/1997 |
| WO | 9719545 | 5/1997 |

OTHER PUBLICATIONS

L.B. Rabiner and R.W. Schafer, "Linear Predictive Coding of Speech" *Digital Processing of Speech Signals*, pp. 396–461 (1978).

Kellner A, et al.: "Padis—An automatic telephone switchboard and directory information system," Speech Communication, NL, Elsevier Science Publishers, Amsterdam, vol. 23, No. 1–2, Oct. 1, 1997, p. 95–111.

* cited by examiner

*Primary Examiner*—Tracy Legree
(74) *Attorney, Agent, or Firm*—Philip R. Wadsworth; Charles D. Brown; George C. Pappas (57) ABSTRACT

A spoken user interface for speech-enabled devices includes a processor and a set of software instructions that are executable by the processor and stored in nonvolatile memory. A user of the speech-enabled device is prompted to enter a voice tag associated with an entry in a call history of the speech-enabled device. The call history includes lists of incoming and outgoing email messages, and incoming and outgoing telephone calls. The user is prompted to enter a voice tag after associated with a telephone number or email address in the call history after a user-selected number of telephone calls has been sent from the speech-enabled device to that telephone number, or has been sent from the telephone with that telephone number to the speech-enabled device, or after a user-selected number of email messages has been sent from the speech-enabled device to that email address, or has been sent from that email address to the speech-enabled device. The user may populate a phonebook of the speech-enabled device with email addresses by sending an email message to the speech-enabled device from a computer and including additional email addresses in the To: field and/or the CC: field of the email message.

30 Claims, 7 Drawing Sheets

SPOKEN USER INTERFACE FOR SPEECH-ENABLED DEVICES

BACKGROUND OF THE INVENTION

I. Field of the Invention

The present invention pertains generally to the field of communications, and more specifically to user interfaces for speech-enabled devices.

II. Background

Voice recognition (VR) represents one of the most important techniques to endow a machine with simulated intelligence to recognize user or user-voiced commands and to facilitate human interface with the machine. VR also represents a key technique for human speech understanding. Systems that employ techniques to recover a linguistic message from an acoustic speech signal are called voice recognizers. The term "voice recognizer" is used herein to mean generally any spoken-user-interface-enabled device. A voice recognizer typically comprises an acoustic processor, which extracts a sequence of information-bearing features, or vectors, necessary to achieve VR of the incoming raw speech, and a word decoder, which decodes the sequence of features, or vectors, to yield a meaningful and desired output format such as a sequence of linguistic words corresponding to the input utterance. To increase the performance of a given system, training is required to equip the system with valid parameters. In other words, the system needs to learn before it can function optimally.

The acoustic processor represents a front-end speech analysis subsystem in a voice recognizer. In response to an input speech signal, the acoustic processor provides an appropriate representation to characterize the time-varying speech signal. The acoustic processor should discard irrelevant information such as background noise, channel distortion, speaker characteristics, and manner of speaking. Efficient acoustic processing furnishes voice recognizers with enhanced acoustic discrimination power. To this end, a useful characteristic to be analyzed is the short time spectral envelope. Two commonly used spectral analysis techniques for characterizing the short time spectral envelope are linear predictive coding (LPC) and filter-bank-based spectral modeling. Exemplary LPC techniques are described in U.S. Pat. No. 5,414,796, which is assigned to the assignee of the present invention and fully incorporated herein by reference, and L. B. Rabiner & R. W. Schafer, Digital Processing of Speech Signals 396–453 (1978), which is also fully incorporated herein by reference.

The use of VR (also commonly referred to as speech recognition) is becoming increasingly important for safety reasons. For example, VR may be used to replace the manual task of pushing buttons on a wireless telephone keypad. This is especially important when a user is initiating a telephone call while driving a car. When using a phone without VR, the driver must remove one hand from the steering wheel and look at the phone keypad while pushing the buttons to dial the call. These acts increase the likelihood of a car accident. A speech-enabled phone (i.e., a phone designed for speech recognition) would allow the driver to place telephone calls while continuously watching the road. And a hands-free car-kit system would additionally permit the driver to maintain both hands on the steering wheel during call initiation.

Speech recognition devices are classified as either speaker-dependent or speaker-independent devices. Speaker-independent devices are capable of accepting voice commands from any user. Speaker-dependent devices, which are more common, are trained to recognize commands from particular users. A speaker-dependent VR device typically operates in two phases, a training phase and a recognition phase. In the training phase, the VR system prompts the user to speak each of the words in the system's vocabulary once or twice so the system can learn the characteristics of the user's speech for these particular words or phrases. An exemplary vocabulary for a hands-free car kit might include the digits on the keypad; the keywords "call," "send," "dial," "cancel," "clear," "add," "delete," "history," "program," "yes," and "no"; and the names of a predefined number of commonly called coworkers, friends, or family members. Once training is complete, the user can initiate calls in the recognition phase by speaking the trained keywords. For example, if the name "John" were one of the trained names, the user could initiate a call to John by saying the phrase "Call John." The VR system would recognize the words "Call" and "John," and would dial the number that the user had previously entered as John's telephone number.

Conventional VR devices rely upon spoken user interfaces, as opposed to graphical user interfaces such as keyboards and monitors, to allow the user to interact with the VR device. The user interacts with the VR device by, e.g., making a telephone call, receiving a telephone call, or accessing features such as voice memo, voice mail, and email using spoken commands. The user's input is captured using known VR techniques, and feedback to the user is provided via text-to-speech (TTS) or recorded prompts.

When the user speaks isolated words, such as a name to be called, which is stored in the memory of the VR device, or a command to be performed, such as commands to organize the phonebook, record and play voice memos, or send an email with the user's speech as a voice attachment, the VR device uses isolated word recognition. Conventional VR technology is quite mature for isolated word recognition for up to approximately forty or fifty words. Hence, the processor and memory resources on a cellular telephone can be used to build an extremely accurate mechanism for spoken user input.

However, for the user to speak a telephone number and have the VR device call the number, the VR device would have to have continuous speech recognition (CSR) capability because people typically do not pause between the individual numbers as they recite a telephone number. The VR device must compare the captured utterance (the spoken telephone number) with ten to the power of N combinations of stored patterns (a ten-digit, speaker-independent vocabulary), where N is the number of digits in the telephone number. CSR technology is also required for the user to enter email addresses into the VR device using speech input. This requires even more processing and memory capabilities, as twenty-six to the power of N combinations must be compared with the captured utterance. CSR technology typically requires more processor and memory resources than isolated word recognition technology, thereby adding manufacturing cost to the VR device (e.g., a cellular telephone). Moreover, CSR technology does not provide a satisfactorily accurate mechanism for speech input, particularly in the noisy environments in which cellular telephones are typically used.

Hence, although most conventional VR products with spoken user interfaces for digit entry use speaker-independent CSR technology, when processor, memory, and/or battery power constraints prohibit the use of the CSR technology, the digit entry feature of the spoken user interface is typically replaced with a traditional keypad entry. Cellular telephone manufacturers, for example, typically use this approach, so that the user is prompted to enter a telephone number using the keypad. However, most users will not take the time and effort to enter a personal phonebook full of telephone numbers by hand, making individual voice tags for each number. Thus, there is a need for a mechanism that uses existing information to establish a user phonebook with voice tags in a VR device.

SUMMARY OF THE INVENTION

The present invention is directed to a mechanism that uses existing information to establish a user phonebook with voice tags in a VR device. Accordingly, in one aspect of the invention, a speech-enabled device advantageously includes at least one mechanism configured to enable a user to exchange information bidirectionally with the speech-enabled device; and logic coupled to the at least one mechanism and configured to prompt the user through the at least one mechanism, in response to occurrence of a user-defined event, to speak a voice tag to be associated with an entry in a call history of the speech-enabled device.

In another aspect of the invention, a speech-enabled device advantageously includes means for enabling a user to exchange information bidirectionally with the speech-enabled device; and means for prompting the user, in response to occurrence of a user-defined event, to speak a voice tag to be associated with an entry in a call history of the speech-enabled device.

In another aspect of the invention, a method of prompting a user to enter a voice tag into a telephone advantageously includes the steps of receiving a user-defined number of messages on the telephone from a particular source; and prompting the user to enter a voice tag associated with the particular source into the telephone after the receiving step has occurred.

In another aspect of the invention, a method of prompting a user to enter a voice tag into a telephone advantageously includes the steps of sending a user-defined number of messages on the telephone to a particular destination; and prompting the user to enter a voice tag associated with the particular destination into the telephone after the sending step has occurred.

In an exemplary embodiment of the invention, an email message may be sent to a telephone from a remote location, the email message being sent concurrently to at least one other email address in order to populate a phone book of the telephone with email addresses.

In another exemplary embodiment of the invention, an email message may be sent to a telephone from a remote location, the email message being copied concurrently to at least one other email address in order to populate a phone book of the telephone with email addresses.

In another aspect of the invention, a user interface for prompting a user to enter a voice tag into a telephone advantageously includes means for receiving a user-defined number of messages on the telephone from a particular source; and means for prompting the user to enter a voice tag associated with the particular source into the telephone after the user-defined number of messages from the particular source has been received.

In another aspect of the invention, a user interface for prompting a user to enter a voice tag into a telephone advantageously includes means for sending a user-defined number of messages on the telephone to a particular destination; and means for prompting the user to enter a voice tag associated with the particular destination into the telephone after the user-defined number of messages to the particular destination has been sent.

DETAILED DESCRIPTION OF THE PREFERRED EMBODIMENTS

Figure 1:
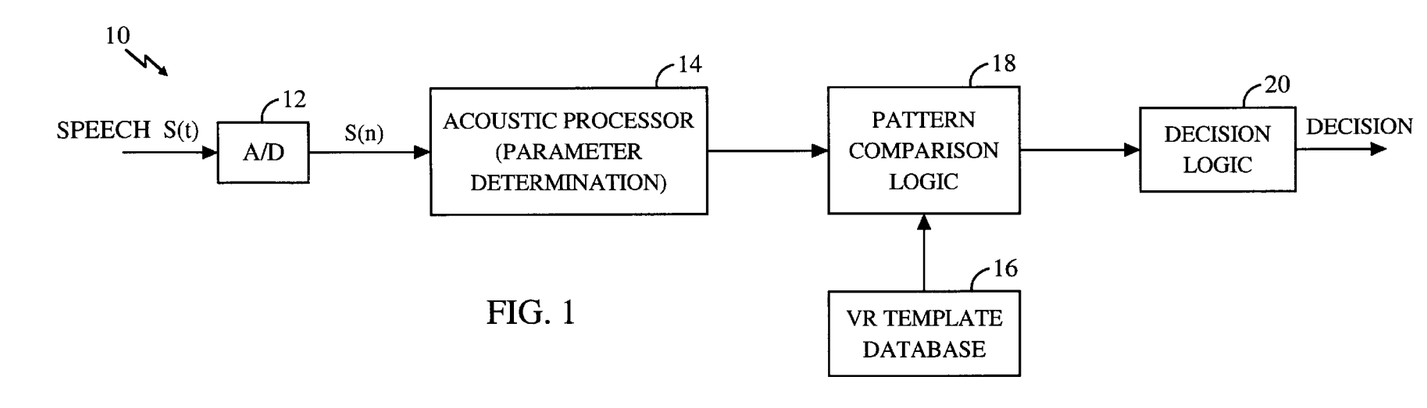
FIG. 1 is a block diagram of a voice recognition system.

In accordance with one embodiment, as illustrated in FIG. 1, a voice recognition system 10 includes an analog-to-digital converter (A/D) 12, an acoustic processor 14, a VR template database 16, pattern comparison logic 18, and decision logic 20. The acoustic processor 14 includes an endpoint detector 22. The VR system 10 may reside in, e.g., a wireless telephone or a hands-free car kit.

When the VR system 10 is in speech recognition phase, a person (not shown) speaks a word or phrase, generating a speech signal. The speech signal is converted to an electrical speech signal s(t) with a conventional transducer (also not shown). The speech signal s(t) is provided to the A/D 12, which converts the speech signal s(t) to digitized speech samples s(n) in accordance with a known sampling method such as, e.g., pulse coded modulation (PCM).

The speech samples s(n) are provided to the acoustic processor 14 for 10 parameter determination. The acoustic processor 14 produces a set of parameters that models the characteristics of the input speech signal s(t). The parameters may be determined in accordance with any of a number of known speech parameter determination techniques including, e.g., speech coder encoding and using fast fourier transform (FFT)-based cepstrum coefficients, as described in the aforementioned U.S. Pat. No. 5,414,796. The acoustic processor 14 may be implemented as a digital signal processor (DSP). The DSP may include a speech coder. Alternatively, the acoustic processor 14 may be implemented as a speech coder.

Parameter determination is also performed during training of the VR system 10, wherein a set of templates for all of the vocabulary words of the VR system 10 is routed to the VR template database 16 for permanent storage therein. The VR template database 16 is advantageously implemented as any conventional form of nonvolatile storage medium, such as, e.g., flash memory. This allows the templates to remain in the VR template database 16 when the power to the VR system 10 is turned off.

The set of parameters is provided to the pattern comparison logic 18. The pattern comparison logic 18 advantageously detects the starting and ending points of an utterance, computes dynamic acoustic features (such as, e.g., time derivatives, second time derivatives, etc.), compresses the acoustic features by selecting relevant frames, and quantizes the static and dynamic acoustic features. Various known methods of endpoint detection, dynamic acoustic feature derivation, pattern compression, and pattern quantization are described in, e.g., Lawrence Rabiner & Biing-Hwang Juang, Fundamentals of Speech Recognition (1993), which is fully incorporated herein by reference. The pattern comparison logic 18 compares the set of parameters to all of the templates stored in the VR template database 16. The comparison results, or distances, between the set of parameters and all of the templates stored in the VR template database 16 are provided to the decision logic 20. The decision logic 20 selects from the VR template database 16 the template that most closely matches the set of parameters. In the alternative, the decision logic 20 may use a conventional "N-best" selection algorithm, which chooses the N closest matches within a predefined matching threshold. The person is then queried as to which choice was intended. The output of the decision logic 20 is the decision as to which word in the vocabulary was spoken.

The pattern comparison logic 18 and the decision logic 20 may advantageously be implemented as a microprocessor, as described below with reference to FIG. 2. The VR system 10 may be, e.g., an application specific integrated circuit (ASIC). The recognition accuracy of the VR system 10 is a measure of how well the VR system 10 correctly recognizes spoken words or phrases in the vocabulary. For example, a recognition accuracy of 95% indicates that the VR system 10 correctly recognizes words in the vocabulary ninety-five times out of 100.

Figure 2:
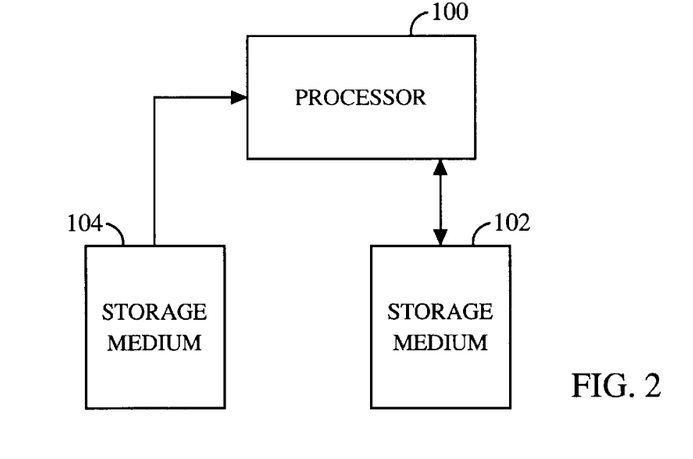
FIG. 2 is a block diagram of a processor and associated storage media for use in a voice recognition system such as the system of FIG. 1.

In accordance with one embodiment, as shown in FIG. 2, a VR device (not shown) includes a processor 100 and first and second storage media 102, 104. The processor 100 is advantageously a microprocessor, but may be any conventional form of processor, dedicated processor, digital signal processor (DSP), controller, or state machine. The processor 100 is coupled to the first storage medium 102, which is advantageously implemented as flash memory, EEPROM memory, or RAM memory. The first storage medium 102 may be on-board RAM memory, or the processor 100 and the first storage medium 102 could reside in an ASIC. The second storage medium 104 is coupled to the processor 100, and is advantageously implemented as a ROM memory configured to hold firmware instructions or a software module to be run on the processor 100. In the alternative, the second storage medium 104 could be implemented as any form of conventional nonvolatile memory.

In one embodiment the VR device is a wireless telephone. In an alternate embodiment the VR device is a hands-free car kit. The VR device includes a call history that is stored in the VR device. The call history is a list of calls made, calls, received, calls missed, etc. A spoken user interface queries a user and adds these numbers to the user's phonebook if directed to do so, as described below with reference to FIGS. 3–8. Accordingly, the most difficult task of speech input (digit entry of telephone numbers) is accomplished using existing information.

In one embodiment the user has the option of turning the feature on or off. If the feature is turned on, an intelligent agent, described below with reference to FIGS. 3–8, monitors the calling patterns of the user. When the VR device is in standby mode, the agent "wakes up" and performs the bookkeeping tasks associated with the phonebook. The next time the user uses he VR device, the user may speak a name to place a call to one of the entries in the phonebook.

In another embodiment email addresses may be entered into the phonebook by the intelligent agent, as described below with reference to FIGS. 3–38. The VR device keeps a history of the incoming alpha-numeric pages. If the caller ID is an email address, the intelligent agent makes a note of the fact. When the agent has the user's attention, the agent gets a voice tag, or name tag, to be attached to the email address. After an email address is enrolled in the phonebook, the user can record a voice memo and, using speech commands, send the voice memo as an attachment to an email over the Internet. The user may send an email or an alpha-numeric page from a computer to his or her VR device, adding other email addresses in the To: field or the CC: field in order to populate his or her phonebook with email addresses.

The second storage medium 104 of FIG. 2, which may advantageously be a ROM memory, serves to hold a software module or a firmware module containing a set of instructions, described below with reference to FIGS. 3–8, that are executable by the processor 100, which may be, a general-purpose microprocessor or a special-purpose processor such as a DSP. The instructions, or code, is advantageously written in C++language, but in the alternative, could be written in any programming language known to those of skill in the art. The first storage medium 102, which may advantageously be a flash memory, serves to hold various lists described below with reference to FIGS. 3–8. As those skilled in the art would understand, the processor 100 and first and second storage media 102, 104 may be substituted for logically equivalent hardware components such as, e.g., registers and FIFO, or discrete transistors.

Figure 3:
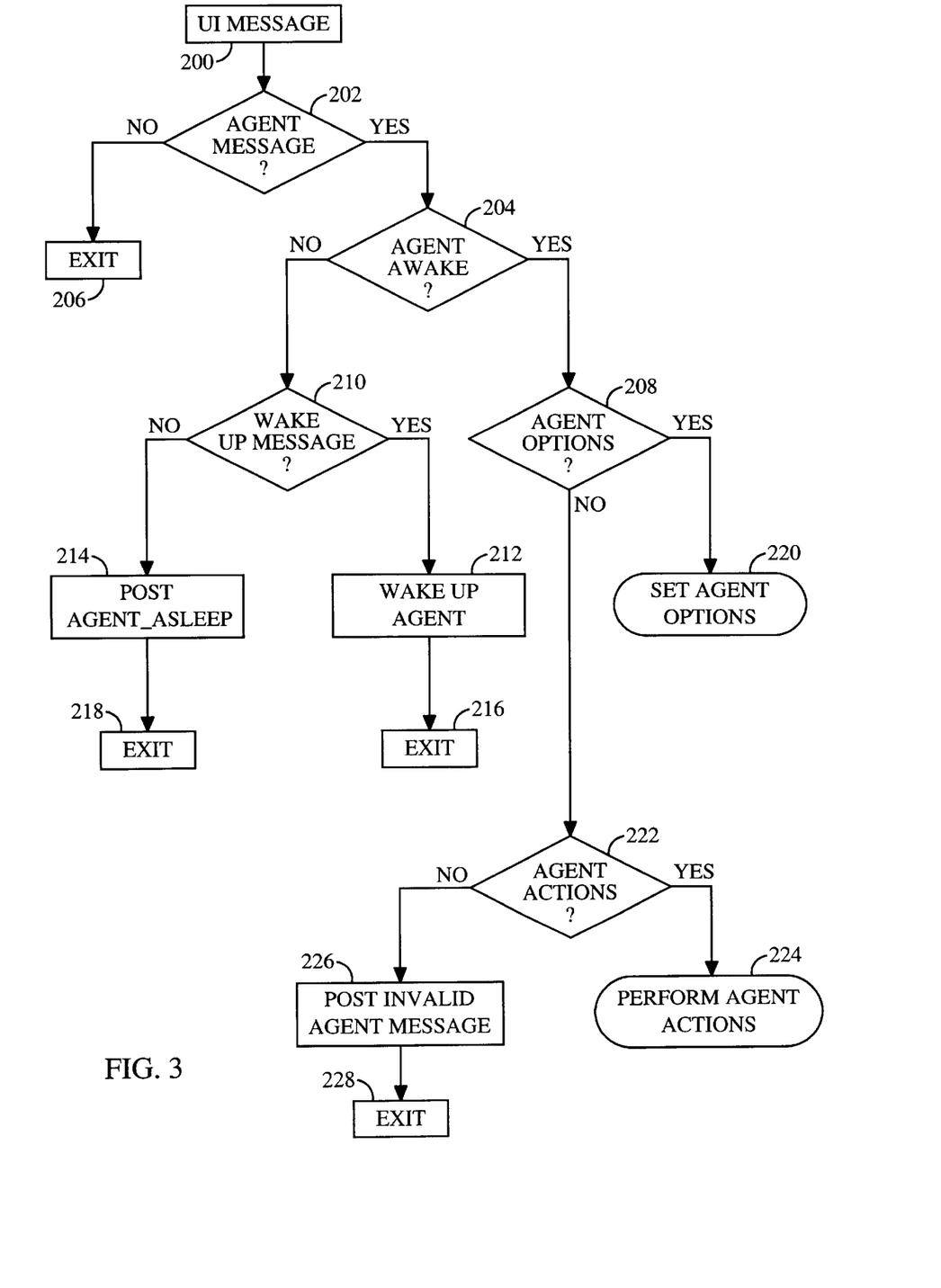
FIG. 3 is a flow chart illustrating method steps performed by a voice recognition system, such as the system of FIG. 1, to process a user interface message.

In accordance with one embodiment, a VR device (not shown) uses an intelligent agent software module (also not shown) to perform the algorithm steps illustrated in the flow charts of FIGS. 3–8 to use existing information to eliminate the need for user input of telephone numbers and email addresses. In FIG. 3, in step 200 a user interface message is received by the VR device. The intelligent agent then proceeds to step 202. In step 202 the agent determines whether the user interface message is a message for the agent. A user inputs the message either manually, e.g., by pressing a keypad on the VR device, or audibly, e.g., by speaking into a microphone on the VR device. If the message is a message for the agent, the agent proceeds to step 204. If, on the other hand, the message is not a message for the agent, the agent proceeds to step 206. In step 206 the agent exits the algorithm.

In step 204 the agent determines whether the agent is in an active, or "awake," mode (as opposed to a standby, or "asleep," mode). If the agent is in the awake mode, the agent proceeds to step 208. If, on the other hand, the agent is not in the awake mode, the agent proceeds to step 210.

In step 210 the agent determines whether the message is a message for the agent to wake up, i.e., to go to the awake mode. If the message is a wakeup message, the agent proceeds to step 212. If, on the other hand, the message is not a wakeup message, the agent proceeds to step 214. In step 212 the agent enters the awake mode. The agent then proceeds to step 216. In step 216 the agent exits the algorithm. In step 214 the agent posts the message "AGENT ASLEEP" to other user interface components (not shown) that the agent is in the asleep mode. The agent then proceeds to step 218. In step 218 the agent exits the algorithm.

In step 208 the agent determines whether the message is a command by the user to set an agent option, or preference. Preferences may include, e.g., enabling a specific keypad to wake up the agent if the user presses the keypad, or establishing a minimum number of telephone calls made by the user to a particular number before the agent will ask the user whether the user would like to add a voice tag for that number. If the message is a command by the user to set an agent option, the agent proceeds to step 220. If, on the other hand, the message is not a command by the user to set an agent option, the agent proceeds to step 222. In step 220 the agent enters a subroutine described below with reference to FIG. 8 in order to set the agent option in accordance with the command from the user.

In step 222 the agent determines whether the message requires the agent to take a specific action. If the message requires the agent to perform an action, the agent proceeds to step 224. If, on the other hand, the message does not require the agent to perform an action, the agent proceeds to step 226. In step 226 the agent posts the message "INVALID AGENT MESSAGE" to the other user interface components that the message is an invalid message for the agent. The agent then proceeds to step 228. In step 228 the agent exits the algorithm. In step 224 the agent enters a subroutine described below with reference to FIG. 4 in order to perform the specific action that was requested by the user.

Figure 4:
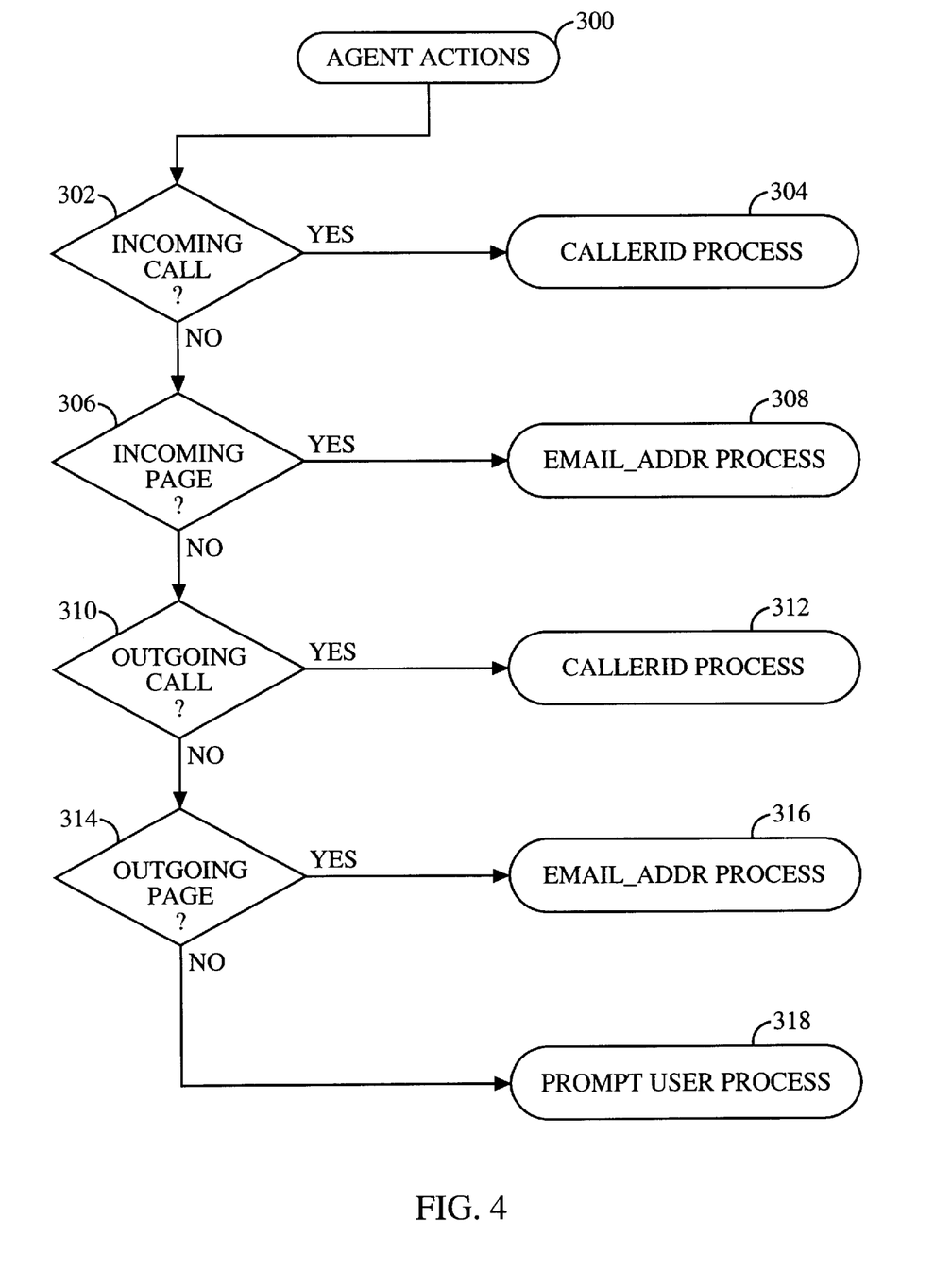
FIG. 4 is a flow chart illustrating method steps performed by a voice recognition system, such as the system of FIG. 1, to perform an agent action.

In one embodiment the agent performs agent actions in accordance with the algorithm steps illustrated in the flow chart of FIG. 4. In step 300 the agent enters a subroutine for performing agent actions. The agent then proceeds to step 302. In step 302 the agent determines whether there is an incoming telephone call to the VR device. If there is an incoming telephone call, the agent proceeds to step 304. If, on the other hand, there is no incoming telephone call, the agent proceeds to step 306. In step 304 the agent enters a subroutine described below with reference to FIG. 5 in order to process the caller ID.

In step 306 the agent determines whether there is an incoming page to the VR device. If there is an incoming page, the agent proceeds to step 308. If, on the other hand, there is no incoming page, the agent proceeds to step 310. In step 308 the agent enters a subroutine described below with reference to FIG. 6 in order to process the email address.

In step 310 the agent determines whether there is an outgoing telephone call from the VR device. If there is an outgoing telephone call, the agent proceeds to step 312. If, on the other hand, there is no outgoing telephone call, the agent proceeds to step 314. In step 312 the agent enters the subroutine described below with reference to FIG. 5 in order to process the caller ID.

In step 314 the agent determines whether there is an outgoing page from the VR device. If there is an outgoing page, the agent proceeds to step 316. If, on the other hand, there is no outgoing page, the agent proceeds to step 318. In step 316 the agent enters the subroutine described below with reference to FIG. 6 in order to process the email address. In step 318 the agent enters a subroutine described below with reference to FIGS. 7A–B in order to prompt a user process. For example, the user may need to be prompted if the user has set a timer for the agent to prompt the user, e.g., once every hour. Or, for example, the user may have specified that the agent is to prompt the user at power up and/or power down of the VR device. Or, for example, the user may have initiated the user prompt process.

Figure 5:
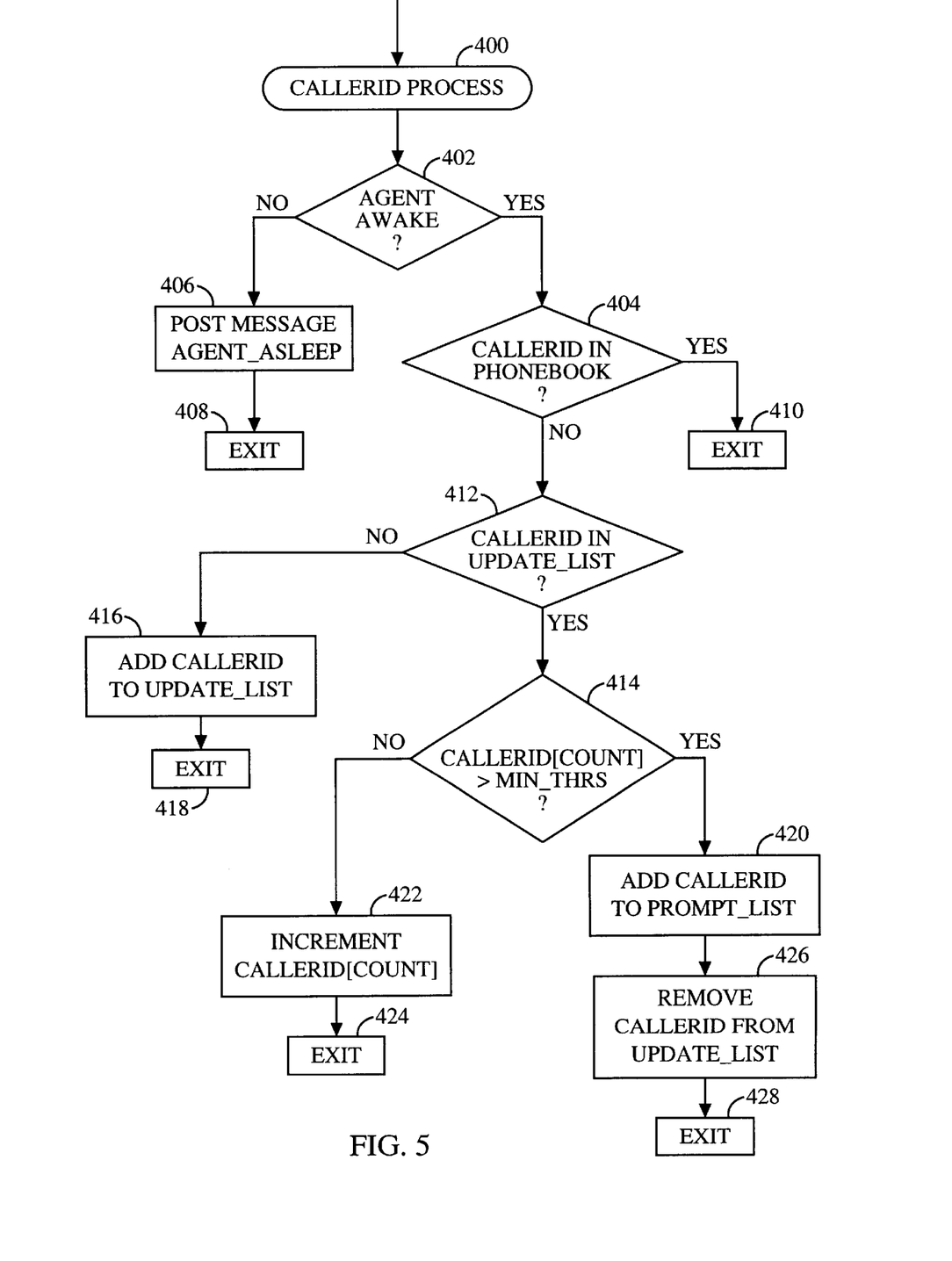
FIG. 5 is a flow chart illustrating method steps performed by a voice recognition system, such as the system of FIG. 1, to process a caller ID.

In one embodiment the agent processes a caller ID for an incoming or outgoing telephone call in accordance with the algorithm steps illustrated in the flow chart of FIG. 5. In step 400 the agent enters a subroutine for processing a caller ID. The agent then proceeds to step 402. In step 402 the agent determines whether the agent is in the awake mode. If the agent is in the awake mode, the agent proceeds to step 404. If, on the other hand, the agent is not in the awake mode, the agent proceeds to step 406. In step 406 the agent posts the message "AGENT ASLEEP" to the other user interface components that the agent is in the asleep mode. The agent then proceeds to step 408. In step 408 the agent exits the algorithm.

In step 404 the agent determines whether the caller ID for the incoming or outgoing telephone call is in the phonebook of the VR device. If the caller ID is in the phonebook, the agent proceeds to step 410. If, on the other hand, the caller ID is not in the phonebook, the agent proceeds to step 412. In step 410 the agent exits the algorithm.

In step 412 the agent determines whether the caller ID is in an update list that is kept in a flash memory of the VR device, i.e., the agent determines whether the caller ID number has called the VR device at least once before or the VR device has called the caller ID number at least once before. If the caller ID is in the update list, the agent proceeds to step 414. If, on the other hand, the caller ID is not in the update list, the agent proceeds to step 416. In step 416 the agent adds the caller ID to the update list. The agent then proceeds to step 418. In step 418 the agent exits the algorithm.

In step 414 the agent determines whether a count for the caller ID exceeds a minimum threshold number, i.e., whether the caller ID number has called the VR device or the VR device has called the caller ID number a certain minimum threshold number of times. The minimum threshold number may advantageously be set by the user as an agent option, or preference. If the count for the caller ID exceeds the minimum threshold number, the agent proceeds to step 420. If, on the other hand, the count for the caller ID does not exceed the minimum threshold number, the agent proceeds to step 422.

In step 422 the agent increments the count for the caller ID, increasing the count for the caller ID by one. The agent then proceeds to step 424. In step 424 the agent exits the algorithm. In step 420 the agent adds the caller ID to a prompt list so that the user will be prompted to add the caller ID number to the phonebook and to associate a voice tag with the caller ID number. The agent then proceeds to step 426. In step 426 the agent removes the caller ID from the update list. The agent then proceeds to step 428. In step 428 the agent exits the algorithm.

Figure 6:
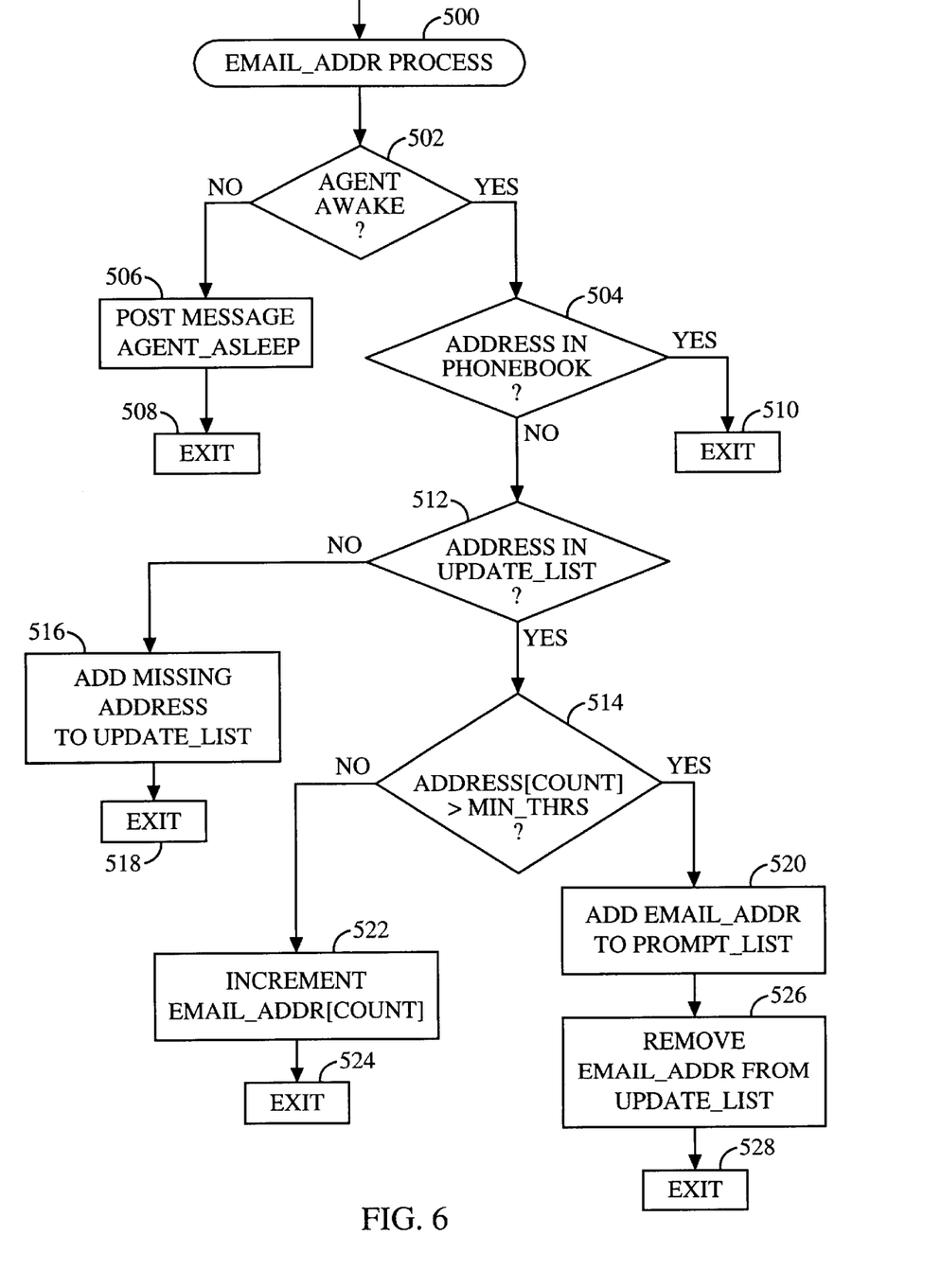
FIG. 6 is a flow chart illustrating method steps performed by a voice recognition system, such as the system of FIG. 1, to process an email address.

In one embodiment the agent processes an email address for an incoming or outgoing page in accordance with the algorithm steps illustrated in the flow chart of FIG. 6. In step 500 the agent enters a subroutine for processing an email address. The agent then proceeds to step 502. In step 502 the agent determines whether the agent is in the awake mode. If the agent is in the awake mode, the agent proceeds to step 504. If, on the other hand, the agent is not in the awake mode, the agent proceeds to step 506. In step 506 the agent posts the message "AGENT ASLEEP" to the other user interface components that the agent is in the asleep mode. The agent then proceeds to step 508. In step 508 the agent exits the algorithm.

In step 504 the agent determines whether the email address for the incoming or outgoing page is in the phonebook of the VR device. If the email address is in the phonebook, the agent proceeds to step 510. If, on the other hand, the email address is not in the phonebook, the agent proceeds to step 512. In step 510 the agent exits the algorithm.

In step 512 the agent determines whether the email address is in an update list that is kept in a flash memory of the VR device, i.e., the agent determines whether the email address has been the source of a page to the VR device at least once before or the VR device has sent an email to the email address at least once before. If the email address is in the update list, the agent proceeds to step 514. If, on the other hand, the email address is not in the update list, the agent proceeds to step 516. In step 516 the agent adds the email address to the update list. The agent then proceeds to step 518. In step 518 the agent exits the algorithm.

In step 514 the agent determines whether a count for the email address exceeds a minimum threshold number, i.e., whether the email address has been the source of a page to the VR device or the VR device has sent an email to the email address a certain minimum threshold number of times. The minimum threshold number may advantageously be set by the user as an agent option, or preference. If the count for the email address exceeds the minimum threshold number, the agent proceeds to step 520. If, on the other hand, the count for the email address does not exceed the minimum threshold number, the agent proceeds to step 522.

In step 522 the agent increments the count for the email address, increasing the count for the email address by one. The agent then proceeds to step 524. In step 524 the agent exits the algorithm. In step 520 the agent adds the email address to a prompt list so that the user will be prompted to add the email address to the phonebook and to associate a voice tag with the email address. The agent then proceeds to step 526. In step 526 the agent removes the email address from the update list. The agent then proceeds to step 528. In step 528 the agent exits the algorithm.

Figure 7A:
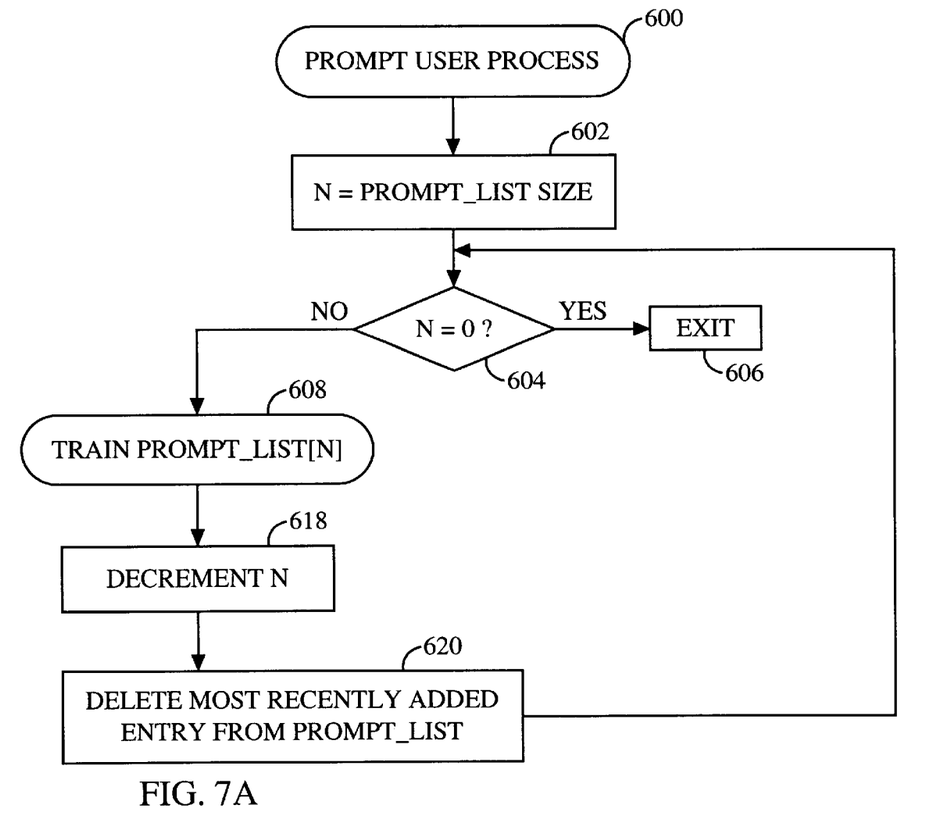
FIG. 7A is a flow chart illustrating method steps performed by a voice recognition system, such as the system of FIG. 1, prompt a user process.

In one embodiment the agent prompts a user process in accordance with the algorithm steps illustrated in the flow chart of FIG. 7A. In step 600 the agent enters a subroutine for prompting a user process. The user prompt process may have been initiated by the user, or the by power up and/or power down of the VR device (if specified by the user), or in response to a user-specified timer. The agent then proceeds to step 602. In step 602 the agent sets the number of entries in the prompt list, i.e., the size of the prompt list, equal to N. The agent then proceeds to step 604.

In step 604 the agent determines whether N is equal to zero. If N equals zero, there are no entries in the prompt list, and the agent proceeds to step 606. In step 606 the agent exits the subroutine. If, on the other hand, in step 604 N does not equal zero, the agent proceeds to step 608. In step 608 the agent enters a subroutine described below with reference to FIG. 7B in order to train the next entry in the prompt list.

Figure 7B:
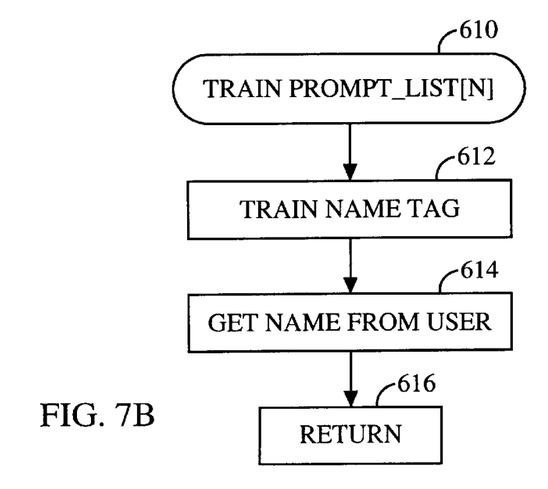
FIG. 7B is a flow chart illustrating a training subroutine within the flow chart of FIG. 7A.

In the training subroutine of FIG. 7B, the agent enters the subroutine to train an entry in the prompt list in step 610. The agent then proceeds to step 612. In step 612 the agent trains a name tag, or voice tag, for the entry. In one embodiment the agent trains the name tag by audibly generating the words "NAME PLEASE" from a speaker on the VR device. The user, upon hearing this phrase, utters a name. The agent then audibly generates the word "AGAIN" from the speaker of the VR device. The user, upon hearing this word, repeats the name. The agent then proceeds to step 614. In step 614 the agent gets a name from the user by generating the message "PLEASE TYPE NAME" to the user on a screen of the VR device. The user, upon seeing this message, types the name using the keypads of the VR device. The agent then proceeds to step 616. If a name already exists in the call history of the VR device, as specified in "Calling Name Presentation" protocols in IS-41, GSM-MAP, etc., the agent may skip step 614, proceeding directly from step 612 to step 616. In step 616 the agent returns to the subroutine of FIG. 7A.

When the training subroutine of FIG. 7B is completed, the agent proceeds to step 618 of FIG. 7A. In step 618 the agent decrements N, decreasing N by one. The agent then proceeds to step 620. In step 620 the agent deletes the most recently added entry from the prompt list, in case of interruption in the process by the user, or by other components of the user interface. The agent then returns to step 604.

In other embodiments the prompt list may be manipulated, or processed, such that the prompt list is no longer ordered based upon when the call was received or dialed, or when the email was received or sent. For example, the prompt list may be sorted in order most-frequently called/received telephone number and most-frequently sent/received email address. This serves to better match the perceptions of the user.

Figure 8:
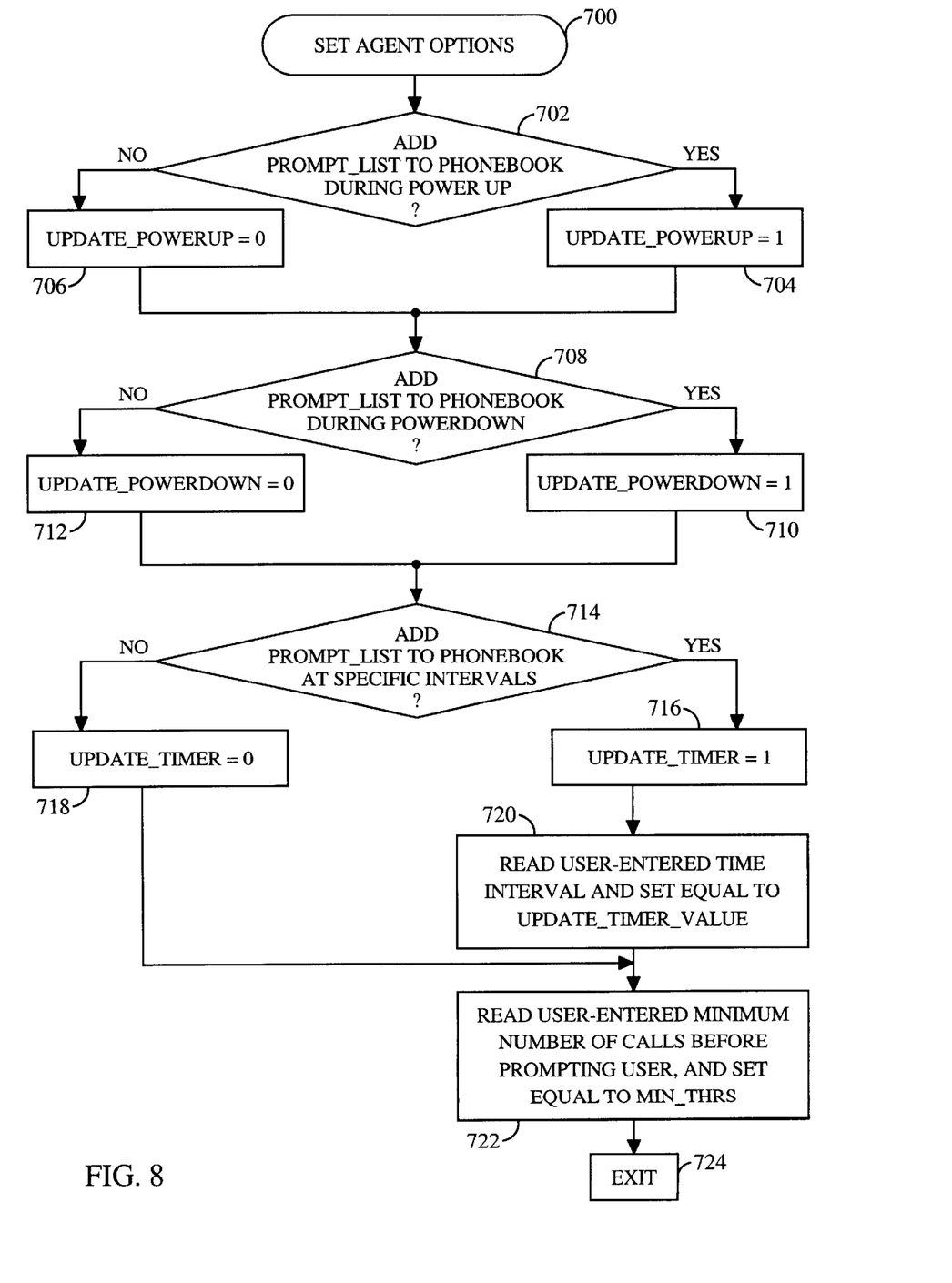
FIG. 8 is a flow chart illustrating method steps performed by a voice recognition system, such as the system of FIG. 1, to set an agent option.

In one embodiment the agent sets an agent option in accordance with the algorithm steps illustrated in the flow chart of FIG. 8. In step 700 the agent enters a subroutine for prompting a user process. The agent then proceeds to step 702. In step 702 the agent determines whether the user would like to add the prompt list to the phonebook during power up of the VR device. The agent makes this determination by generating a message to the user on the screen of the VR device. Alternatively, the agent may query the user audibly through the speaker of the VR device. If the user wants to add the prompt list to the phonebook during power up of the VR device, the user presses a first predefined keypad on the VR device. If the user does not want to add the prompt list to the phonebook during power up of the VR device, the user presses a second predefined keypad on the VR device.

If in step 702 the prompt list is to be added to the phonebook during power up of the VR device, the agent proceeds to step 704. If, on the other hand, the prompt list is not to be added to the phonebook during power up of the VR device, the agent proceeds to step 706. In step 704 the agent sets a parameter called UPDATE_POWERUP equal to one. The agent then proceeds to step 708. In step 706 the agent sets the parameter called UPDATE_POWERUP equal to zero. The agent then proceeds to step 708.

In step 708 the agent determines whether the user would like to add the prompt list to the phonebook during power down of the VR device. The agent makes this determination by generating a message to the user on the screen of the VR device. Alternatively, the agent may query the user audibly through the speaker of the VR device. If the user wants to add the prompt list to the phonebook during power down of the VR device, the user presses the first predefined keypad on the VR device. If the user does not want to add the prompt list to the phonebook during power down of the VR device, the user presses the second predefined keypad on the VR device.

If in step 708 the prompt list is to be added to the phonebook during power down of the VR device, the agent proceeds to step 710. If, on the other hand, the prompt list is not to be added to the phonebook during power down of the VR device, the agent proceeds to step 712. In step 710 the agent sets a parameter called UPDATE_POWERDOWN equal to one. The agent then proceeds to step 714. In step 712 the agent sets the parameter called UPDATE_POWERDOWN equal to zero. The agent then proceeds to step 714.

In step 714 the agent determines whether the user would like to add the prompt list to the phonebook at specific time intervals. The agent makes this determination by generating a message to the user on the screen of the VR device. Alternatively, the agent may query the user audibly through the speaker of the VR device. If the user wants to add the prompt list to the phonebook at specific time intervals, the user presses the first predefined keypad on the VR device. If the user does not want to add the prompt list to the phonebook at specific time intervals, the user presses the second predefined keypad on the VR device.

If in step 714 the prompt list is to be added to the phonebook at specific time intervals, the agent proceeds to step 716. If, on the other hand, the prompt list is not to be added to the phonebook at specific time intervals, the agent proceeds to step 718. In step 716 the agent sets a parameter called UPDATE_TIMER equal to one. The agent then proceeds to step 720. In step 718 the agent sets the parameter called UPDATE_TIMER equal to zero. The agent then proceeds to step 722. In step 720 the agent reads a user-entered time interval and sets the user-entered time interval equal to a parameter called UPDATE_TIMER_VALUE. To read the user-entered time interval, the agent first generates the message "ENTER TIME INTERVAL" to the user on the screen of the VR device. The user responds by pressing appropriate keypads on the VR device to specify a desired time interval to the agent. The agent then proceeds to step 722.

In step 722 the agent reads a user-entered minimum number of calls placed/received, or email addresses sent/received, and sets the user-entered minimum number equal to the minimum threshold number described above with reference to FIGS. 5–6, a parameter called MIN_THRS. To read the user-entered minimum number, the agent first generates the message "ENTER MINIMUM NUMBER OF CALLS" to the user on the screen of the VR device. The user responds by pressing appropriate keypads on the VR device to specify for the agent a desired minimum number of calls or emails sent or received. The agent then proceeds to step 724. In step 724 the agent exits the algorithm.

Thus, a novel and improved spoken user interface for speech-enabled devices has been described. Those of skill in the art would understand that the various illustrative logical blocks and algorithm steps described in connection with the embodiments disclosed herein may be implemented or performed with a digital signal processor (DSP), an application specific integrated circuit (ASIC), discrete gate or transistor logic, discrete hardware components such as, e.g., registers and FIFO, a processor executing a set of firmware instructions, or any conventional programmable software module and a processor. The processor may advantageously be a microprocessor, but in the alternative, the processor may be any conventional processor, controller, microcontroller, or state machine. The software module could reside in RAM memory, flash memory, registers, or any other form of writable storage medium known in the art. Those of skill would further appreciate that the data, instructions, commands, information, signals, bits, symbols, and chips that may be referenced throughout the above description are advantageously represented by voltages, currents, electromagnetic waves, magnetic fields or particles, optical fields or particles, or any combination thereof.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. A speech-enabled device, comprising:
    at least one mechanism configured to enable a user to exchange information bidirectionally with the speech-enabled device; and
    a software agent coupled to the at least one mechanism and configured to automatically prompt the user through the at least one mechanism, in response to occurrence of a user-defined event, to speak a voice tag to be associated with an entry in an automatically generated call history of the speech-enabled device, wherein automatically is without manual user intervention.

2. The device of claim 1, wherein the logic comprises a processor and a nonvolatile memory containing a set of software instructions executable by the processor.

3. The device of claim 1, wherein the call history includes at least one of the following lists: incoming pages to the device, outgoing email messages from the device, incoming telephone calls to the device, and outgoing telephone calls from the device.

4. The device of claim 1, further comprising a storage medium configured to store a user phonebook, wherein the device comprises a wireless telephone configured to receive telephone calls, the user-defined event comprises occurrence of a user-defined number of telephone calls to the device from a particular telephone number, and the entry comprises the particular telephone number, wherein the entry is stored in the user phonebook.

5. The device of claim 1, further comprising a storage medium configured to store a user phonebook, wherein the device is configured to receive email messages, the user-defined event comprises occurrence of a user-defined number of pages to the device from a particular email address, and the entry comprises the particular email address, wherein the entry is stored in the user phonebook.

6. The device of claim 1, further comprising a storage medium configured to store a user phonebook, wherein the device comprises a wireless telephone configured to send telephone calls, the user-defined event comprises occurrence of a user-defined number of telephone calls from the device to a particular telephone number, and the entry comprises the particular telephone number, wherein the entry is stored in the user phonebook.

7. The device of claim 1, further comprising a storage medium configured to store a user phonebook, wherein the device is configured to send email messages, the user-defined event comprises occurrence of a user-defined number of email messages from the device to a particular email address, and the entry comprises the particular email address, wherein the entry is stored in the user phonebook.

8. A speech-enabled device, comprising:
    means for enabling a user to exchange information bidirectionally with the speech-enabled device; and
    means for automatically via a software agent prompting the user, in response to occurrence of a user-defined event, to speak a voice tag to be associated with an entry in an automatically generated_call history of the speech-enabled device, wherein automatically is without manual user intervention.

9. The device of claim 8, wherein the means for prompting comprises a processor and a nonvolatile memory containing a set of software instructions executable by the processor.

10. The device of claim 8, wherein the call history includes at least one of the following lists: incoming pages to the device, outgoing email messages from the device, incoming telephone calls to the device, and outgoing telephone calls from the device.

11. The device of claim 8, further comprising means for storing a user phonebook, wherein the device comprises a wireless telephone configured to receive telephone calls, the user-defined event comprises occurrence of a user-defined number of telephone calls to the device from a particular telephone number, and the entry comprises the particular telephone number, wherein the entry is stored in the means for storing.

12. The device of claim 8, further comprising means for storing a user phonebook, wherein the device is configured to receive email messages, the user-defined event comprises occurrence of a user-defined number of pages to the device from a particular email address, and the entry comprises the particular email address, wherein the entry is stored in the means for storing.

13. The device of claim 8, further comprising means for storing a user phonebook, wherein the device comprises a wireless telephone configured to send telephone calls, the user-defined event comprises occurrence of a user-defined number of telephone calls from the device to a particular telephone number, and the entry comprises the particular telephone number, wherein the entry is stored in the means for storing.

14. The device of claim 8, further comprising means for storing a user phonebook, wherein the device is configured to send email messages, the user-defined event comprises occurrence of a user-defined number of email messages from the device to a particular email address, and the entry comprises the particular email address, wherein the entry is stored in the means for storing.

15. A method of automatically prompting a user to enter a voice tag into a telephone, comprising the steps of:

receiving a user-defined number of messages on the telephone from a particular source; and prompting the user, automatically via a software agent, to enter a voice tag associated with the particular source into the telephone after the receiving step has occurred, wherein automatically is without manual user intervention.

16. The method of claim 15, wherein the messages comprise telephone calls and the particular source comprises a telephone number.

17. The method of claim 15, wherein the messages comprise pages and the particular source comprises an email address.

18. The method of claim 15, further comprising the step of sending an email message to the telephone from a remote location, the email message being sent concurrently to at least one other email address.

19. The method of claim 15, further comprising the step of sending an email message to the telephone from a remote location, the email message being copied concurrently to at least one other email address.

20. A method of automatically prompting a user to enter a voice tag into a telephone, comprising the steps of:

sending a user-defined number of messages on the telephone to a particular destination; and prompting the user, automatically via a software agent, to enter a voice tag associated with the particular destination into the telephone after the sending step has occurred, wherein automatically is without manual user intervention.

21. The method of claim 20, wherein the messages comprise telephone calls and the particular destination comprises a telephone number.

22. The method of claim 20, wherein the messages comprise pages and the particular destination comprises an email address.

23. The method of claim 20, further comprising the step of sending an email message to the telephone from a remote location, the email message being sent concurrently to at least one other email address.

24. The method of claim 20, further comprising the step of sending an email message to the telephone from a remote location, the email message being copied concurrently to at least one other email address.

25. A user interface for automatically prompting a user to enter a voice tag into a telephone, comprising:

means for receiving a user-defined number of messages on the telephone from a particular source number; and means for prompting the user, automatically via a software agent, to enter a voice tag associated with the particular source into the telephone after the user-defined number of messages from the particular source number has been received, wherein automatically is without manual user intervention.

26. The user interface of claim 25, wherein the messages comprise telephone calls and the particular source comprises a telephone number.

27. The user interface of claim 25, wherein the messages comprise pages and the particular source comprises an email address.

28. A user interface for automatically prompting a user to enter a voice tag into a telephone, comprising:

means for sending a user-defined number of messages on the telephone to a particular destination; and means for prompting the user, automatically via a software agent, to enter a voice tag associated with the particular destination into the telephone after the user-defined number of messages to the particular destination has been sent, wherein automatically is without manual user intervention.

29. The user interface of claim 28, wherein the messages comprise telephone calls and the particular destination comprises a telephone number.

30. The user interface of claim 28, wherein the messages comprise pages and the particular destination comprises an email address.

* * * * *